Feb. 10, 1942.   H. COLOMB   2,272,336
BEARING FOR CLOCKWORK MOVEMENTS
Filed Sept. 21, 1938
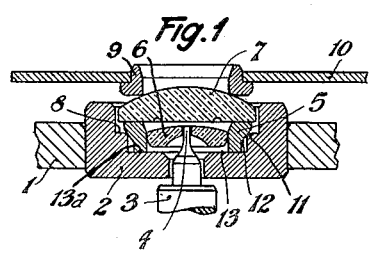
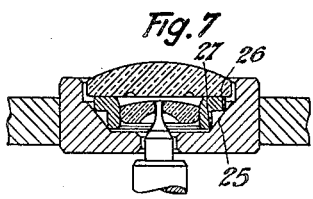
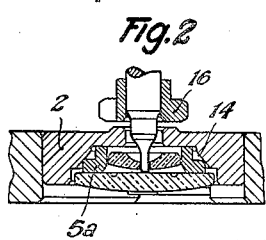
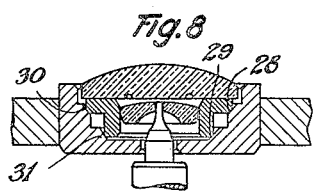
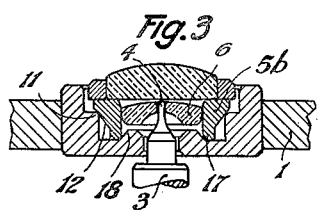
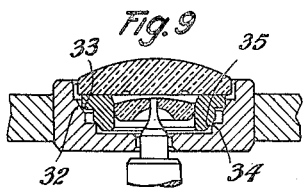
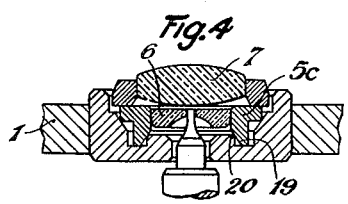
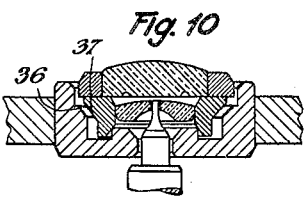
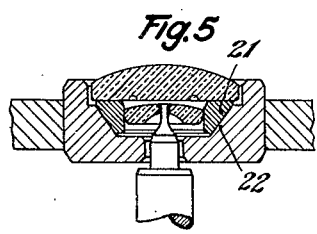
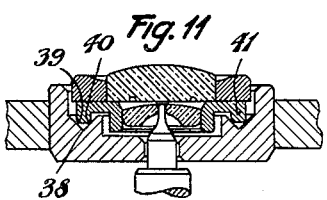
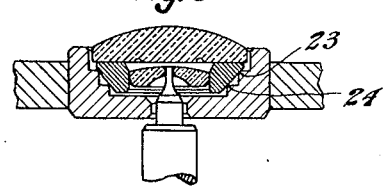
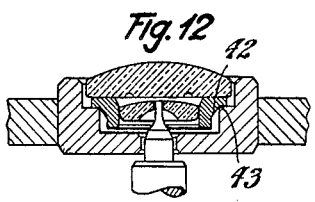
H. Colomb
Inventor
By: Glascock Downing & Seebold
Attys.

Patented Feb. 10, 1942

2,272,336

UNITED STATES PATENT OFFICE 2,272,336

BEARING FOR CLOCKWORK MOVEMENTS

Henri Colomb, Lausanne, Switzerland

Application September 21, 1938, Serial No. 231,053
In Switzerland September 29, 1937

4 Claims. (Cl. 308—2)

The present invention relates to shock absorbing bearings for clockwork pivots, of the type including a movable perforated bearing member which is yieldingly maintained in the cavity of a fixed bearing support by resilient means acting on an intermediate cap bearing member suitably supported by the perforated bearing member, all that in order to prevent shocks or jars from damaging the pivot received in the bearing.

It is an object of the invention to provide means in a bearing of the above stated type which permit obtaining a perfect centering of the movable bearing member in the stationary bearing support.

A further object of the invention is to provide for separate mountings of the perforated bearing member and the cap bearing member in overlying relation to each other without affecting the close relationship of said members in case of shocks or vibrations whereby, in particular, the cap member is prevented from tilting about one side and getting off the perforated member in case the clockwork is subjected to shock or jar which exerts an axial or radial thrust on the pivot.

Other objects and advantages of the invention will become apparent as the specification proceeds.

The accompanying drawing illustrates by way of example various embodiments of the present invention.

Figure 1 is a sectional view of one form of bearing constructed in accordance with the invention.

Fig. 2 is a similar view of the bottom bearing of a balance wheel.

Figs. 3 to 12 are similar views of various modifications of the invention.

In Figure 1 a bearing support 2 is fixed to a piece of the frame 1, to the balance wheel bridge, for instance. It is freely traversed by a stem of the shaft 3 of a balance wheel, limiting the lateral and upward movements thereof. The support 2 presents a cavity comprising two cylindrical parts of different diameter separated by an annular shoulder 8 which looks towards the external side of the frame and the interior edge 11 of which is rounded or bevelled. In this cavity are disposed a bezel 5 and a perforated jewel 6 traversed by the pivot 4 of the shaft 3, and a cap jewel 7. The bezel 5 rests with a conical surface 12 on said rounded edge 11. The cap jewel is bearing against the external face of the bezel 5 and is inserted into the wider of the two parts of the cavity, wherein it can play a little being kept in place together with the bezel 5 by means of a spring 10 exerting a pressure upon it by an intermediate ring 9. There is an appreciable distance between the internal surface of the cap jewel 7 and the shoulder 8, while the internal face 13a of the bezel is very close to the bottom 13 of the cavity or even resting on this bottom but without disengaging the cone 12 of the bezel from bearing against the edge 11.

The truncated cone surface 12 is disposed between two cylindrical surfaces of the circumference of the bezel 5.

When at rest, the perforated part 5, 6 is centered in the support 2 by the rounded edge 11 cooperating with the conical surface 12 and by the transversal surface 13a of this perforated part applied against the transversal surface 13 of the support, or ready to be applied at a little movement. Be it supposed the axle 3 is subjected to a shock having a horizontal component directed from the left to the right in Fig. 1; the portion at the right hand side of the conical surface 12 is going to slide upwardly on the edge 11 and the left hand part of the transversal surface 13a slides along the bottom 13; the cap jewel 7 is too far from the shoulder 8 of the support for coming into contact with it. Consequently the cap jewel will remain applied against the perforated part of 5 and the oil kept between these parts will remain there without being subjected to modifications.

Figure 2, representing the bottom bearing of a balance wheel, the little collar of which is indicated by 16, shows that the conical surface 14, producing the described effect, can belong to the support 2, while the bezel 5a is then provided with a shoulder, the rounded edge of which is resting on this surface. The spring is only partially represented.

The bezel 5b shown in Figure 3 is higher than the perforated jewel, and the bottom of the cavity presents an annular projection with a conical surface 18, which is surrounded by the internal edge of the extension 17 of the bezel 5b. When subjected to a shock, the perforated part 5b, 6 will slide along the edge 11 and along the conical surface 18 in a manner that it moves parallel to itself. The pair of elements 11, 12 is disposed at an outmost possible distance from the surface 18.

Figure 4 shows that the above described effect can also be obtained, if it is the extension of the bezel 5c which presents an internal conical surface 19 and if it is the annular projecture which presents a rounded, circular abutting edge 20.

It will be understood, that wherever hereinbefore a rounded, circular abutting edge is mentioned, this edge could be replaced by a slightly bevelled edge or by a sharp edge without being greatly modified; this concerns as well the pairs of circular elements situated in the bottom of the cavity as those situated in half height of it.

The cap jewel can be carried by a bezel resting on the perforated part as shown in Figures 3 and 4.

In the embodiment according to Figure 5, the bezel of the perforated jewel presents a single conical surface 21 cooperating with a single conical surface 22 of the support. In the embodiment shown in Figure 6, this surface 22 is replaced by two edges 23 and 24 disposed at a distance one above the other, while in the embodiment to Figure 7, it is the bezel of the perforated jewel which presents those two edges 26 and 27 cooperating with a single conical surface 25 of the support. In the embodiment shown in Figure 8, the bezel carries two bevelled edges 28 and 29 which cooperate each with a small conical surface 30, respectively 31, of the support. At last, Figure 9 shows an embodiment, wherein a conical surface 32 of the support cooperates with a sharp edge 33 of the bezel and, inversely, a sharp edge 34 of the support cooperates with a conical surface 35 of the bezel. The embodiment shown in Figure 10 is not different from that one in Figure 4 merely because the bezel carries the conical surface 37 and the support presents the bevelled edge 36. In the embodiment shown in Figure 11, the support presents an annular groove 38 having two inclined flanks forming conical surfaces, with each of which cooperates an edge 39, respectively 40 of an annular projecture 41 provided at the bezel. In the embodiment shown in Figure 12, there is only a single conical surface 42 on the bezel, cooperating with a slightly bevelled edge 43 of the support of the bearing.

In all these embodiments there are transversal surfaces in juxtaposition, constituted by the lower part of the bezel and by the bottom of the support, with the exception of Figure 12, where one of these surfaces is disposed on the upper portion of the bezel, the other one in juxtaposition thereto, being constituted by a shoulder of the support of the bearing. These surfaces are in contact with or very close to each other and serve as abutments to secure the centering of the bearing bush, if the bearing is fitted with a pair of circular elements and if only one of them presents a conical surface.

If these two circular centering elements are conical surfaces having the same conical shape, or if the bearing is at least provided with two pairs of centering elements, these transversal surfaces cannot serve for the centering, but permit then that the process of rectifying described in the U. S. A. patent (U. S. A. patent application No. 215,024) can be applied to the perforated part and to the support.

It will be noticed that in certain described modifications the perforated part of the bearing presents external cylindrical surfaces. This arrangement permits not only to seize easily this part, but also that the dimensions determining the truncated conical surface, if this one belongs to the perforated part, at their turning can exactly be verified by measuring the diameter of one or the other of the cylindrical portions.

The fact, that the interior face of the cap jewel never comes into contact with the support, results that the oil is not spread over the latter, but remains in its place.

I claim:

1. A shock absorbing bearing for clockwork pivots comprising in combination a stationary bearing support having a cavity with an upper and a lower cylindrical chamber and an annular shoulder separating said chambers, a bezel loosely supported in the lower chamber and capable of axial and lateral or tilting movement within said lower chamber, a perforated bearing member carried by said bezel and adapted to receive the pivot, said support and bezel being each provided with at least a circular centering element adapted to cooperate with each other for centering the perforated bearing member within said support, a cap bearing member movably mounted in the upper chamber in overlying relation to said bezel and perforated bearing member and in overlying and spaced relation to the annular shoulder at a distance therefrom sufficient to prevent said cap bearing member abutting said shoulder and, hence, from tilting off the bezel and perforated bearing member in case the clockwork is subjected to jar which exerts an axial or radial thrust on the pivot, and spring means freely engaging said cap bearing member for pressing said cap member against said bezel and for yieldingly maintaining said bezel and perforated bearing member in said cavity.

2. A shock absorbing bearing for clockwork pivots comprising in combination a stationary bearing support having a cavity with an upper and a lower cylindrical chamber and an annular shoulder separating said chambers, a bezel loosely supported in the lower chamber and capable of axial and lateral or tilting movement within said lower chamber, a perforated bearing member carried by said bezel and adapted to receive the pivot, said support presenting a substantially rounded edge on its annular shoulder and a transverse abutting surface at its bottom, and said bezel being provided, on the one hand, with a substantially conical surface cooperating with said edge and, on the other hand, with a plane annular base cooperating with said transverse abutting surface, all that for centering the perforated bearing member within said support, a cap bearing member movably mounted in the upper chamber in overlying relation to said bezel and perforated bearing member and in overlying and spaced relation to said annular shoulder at a distance therefrom sufficient to prevent said cap bearing member from abutting said shoulder and, hence, from tilting off the bezel and the perforated bearing member in case the clockwork is subjected to shock or jar which exerts an axial or radial thrust on the pivot, and spring means freely engaging said cap bearing member for pressing said cap member against said bezel and for yieldingly maintaining said bezel and perforated bearing member in said cavity.

3. A shock absorbing bearing for clockwork pivots comprising in combination a stationary bearing support having a cavity with an upper and a lower cylindrical chamber and an annular shoulder separating said chambers, a bezel loosely supported in the lower chamber and capable of axial and lateral or tilting movement within said lower chamber, a perforated bearing member carried by said bezel and adapted to receive the pivot, said support presenting a substantially conical surface on its annular shoulder and a sharp edge at its bottom, and said bezel being provided, on the one hand, with a sharp edge disposed at the top of the bezel and cooperating with said conical surface of the support and, on the other hand, with an annular conical surface disposed at the bottom of the bezel and adapted to cooperate with said sharp edge on the support, all that for centering the perforated bearing member within said support, a cap bearing member movably mounted in the upper chamber in overlying relation to said bezel and perforated bearing member and in overlying and spaced relation to said annular shoulder at a distance therefrom sufficient to prevent said cap bearing member from abutting said shoulder and, hence, from tilting off the bezel and the perforated bearing member in case the clockwork is subjected to shock or jar which exerts an axial or radial thrust on the pivot, and spring means freely engaging said cap bearing member for pressing said cap member against said bezel and for yieldingly maintaining said bezel and perforated bearing member in said cavity.

4. A shock absorbing bearing for clockwork pivots comprising in combination a stationary bearing support having a cavity with an upper and a lower cylindrical chamber and an annular shoulder separating said chambers, a bezel loosely supported in the lower chamber and capable of axial and lateral or tilting movement within said lower chamber, a perforated bearing member carried by said bezel and adapted to receive the pivot, said support presenting a substantially rounded upper edge on its annular shoulder and a substantially rounded conical lower edge at its bottom, and said bezel having, on the one hand, at its outer peripheral face a first substantially conical surface cooperating with said upper edge and, on the other hand, at its inner peripheral face a second substantially conical surface oppositely inclined with respect to said first conical surface and adapted to cooperate with said lower edge, all that for centering the perforated bearing member within said support, a cap bearing member movably mounted in the upper chamber in overlying relation to said bezel and perforated bearing member and in overlying and spaced relation to said annular shoulder at a distance therefrom sufficient to prevent said cap bearing member from abutting said shoulder and, hence, from tilting off the bezel and the perforated bearing member in case the clockwork is subjected to shock or jar which exerts an axial or radial thrust on the pivot, and spring means freely engaging said cap bearing member for pressing said cap member against said bezel and for yieldingly maintaining said bezel and perforated bearing member in said cavity.

HENRI COLOMB.